US006083422A

United States Patent [19]

Ambuter et al.

[11] Patent Number: 6,083,422

[45] Date of Patent: Jul. 4, 2000

[54] THICKENED BLEACH COMPOSITIONS

[75] Inventors: Hal Ambuter, Medina; Sahira Vijay Kotian, Hudson, both of Ohio

[73] Assignee: The B.F. Goodrich Company, Richfield, Ohio

[21] Appl. No.: 09/388,949

[22] Filed: Sep. 2, 1999

Related U.S. Application Data

[63] Continuation of application No. 08/985,487, Dec. 4, 1997, Pat. No. 5,997,764.

[51] Int. Cl.[7] .......................... C01B 11/06; C11D 3/395; C11D 7/54

[52] U.S. Cl. .............................. 252/187.26; 252/187.25; 252/187.24; 510/302

[58] Field of Search ........................ 252/187.25, 187.26, 252/187.24; 510/302

[56] References Cited

U.S. PATENT DOCUMENTS

| | | | |
|---|---|---|---|
| 2,798,053 | 7/1957 | Brown . | |
| 2,838,459 | 6/1958 | Sprout, Jr. | 252/186.29 |
| 3,192,255 | 6/1965 | Cann | 562/3 |
| 3,442,937 | 5/1969 | Sennewald et al. | 562/3 |
| 3,554,473 | 1/1971 | Rakov et al. | 248/44 |
| 3,630,923 | 12/1971 | Simmons et al. | 510/228 |
| 3,715,184 | 2/1973 | Kuhling et al. | 510/229 |
| 3,888,781 | 6/1975 | Kingry et al. | 510/229 |
| 3,915,921 | 10/1975 | Schlatzer, Jr. | 526/238.23 |
| 3,985,668 | 10/1976 | Hartman | 510/369 |
| 4,001,132 | 1/1977 | Magiure, Jr. | 510/228 |
| 4,046,705 | 9/1977 | Yagi et al. . | |
| 4,130,501 | 12/1978 | Lutz et al. | 252/186.27 |
| 4,203,877 | 5/1980 | Baker | 524/500 |
| 4,207,405 | 6/1980 | Masler, III et al. | 525/328 |
| 4,238,192 | 12/1980 | Kandathil | 8/111 |
| 4,295,928 | 10/1981 | Breslin | 162/73 |
| 4,421,902 | 12/1983 | Chang et al. | 526/317 |
| 4,497,725 | 2/1985 | Smith et al. | 8/137 |
| 4,509,949 | 4/1985 | Huang et al. | 586/558 |
| 4,696,757 | 9/1987 | Blank et al. | 252/186.29 |
| 4,788,052 | 11/1988 | Ng et al. | 424/53 |
| 4,792,443 | 12/1988 | Filomeno | 424/62 |
| 4,839,156 | 6/1989 | Ng et al. | 424/53 |
| 4,839,157 | 6/1989 | Mei-King et al. | 424/53 |
| 4,900,468 | 2/1990 | Mitchell et al. | 8/648 |
| 4,923,940 | 5/1990 | Hsu | 526/208 |
| 4,996,274 | 2/1991 | Hsu | 526/208 |
| 5,004,598 | 4/1991 | Lochhead et al. | 424/59 |
| 5,122,365 | 6/1992 | Murayama | 424/49 |
| 5,169,552 | 12/1992 | Wise | 510/223 |
| 5,180,514 | 1/1993 | Farr et al. | 8/109 |
| 5,185,096 | 2/1993 | Ahmed | 510/221 |
| 5,225,096 | 7/1993 | Ahmed et al. | 510/223 |
| 5,229,027 | 7/1993 | Ahmed | 510/221 |
| 5,264,143 | 11/1993 | Boutique | 510/303 |
| 5,279,755 | 1/1994 | Choy et al. | 510/369 |
| 5,348,682 | 9/1994 | Finley et al. | 252/186.36 |
| 5,349,030 | 9/1994 | Long, II et al. | 525/450 |
| 5,376,146 | 12/1994 | Casperson et al. | 8/408 |
| 5,384,061 | 1/1995 | Wise | 252/186.36 |
| 5,393,305 | 2/1995 | Cohen et al. | 8/406 |
| 5,419,847 | 5/1995 | Showell et al. | 8/137 |
| 5,427,707 | 6/1995 | Drapier et al. | 510/222 |
| 5,470,499 | 11/1995 | Choy et al. | 510/398 |
| 5,503,766 | 4/1996 | Tokuoka et al. | 252/189 |
| 5,529,711 | 6/1996 | Brodbeck et al. | 510/369 |
| 5,545,349 | 8/1996 | Kurii et al. | 252/186.38 |
| 5,549,842 | 8/1996 | Chang | 510/191 |
| 5,597,789 | 1/1997 | Sadlowski | 510/230 |

FOREIGN PATENT DOCUMENTS

| | | |
|---|---|---|
| 0 421 738 A2 | 4/1991 | European Pat. Off. . |
| 0 510 945 A2 | 10/1992 | European Pat. Off. . |
| 0 523 826 A1 | 1/1993 | European Pat. Off. . |
| 0 606 707 A1 | 7/1994 | European Pat. Off. . |
| 0 649 898 A2 | 4/1995 | European Pat. Off. . |
| 0 668 345 A1 | 8/1995 | European Pat. Off. . |
| 0 373 864 B1 | 3/1996 | European Pat. Off. . |
| 0 812 904 A2 | 12/1997 | European Pat. Off. . |
| 7-150689 | 1/1997 | Japan . |
| WO 93/21298 | 10/1993 | WIPO . |
| PCT/US98/24413 | 4/1999 | WIPO . |

OTHER PUBLICATIONS

Technical Data Sheet, Solvay Interox, “Thickened Hydrogen Peroxide”, 1996.

Technical Data sheet, Solvay Interox, “Hydrogen Peroxide Compatible Ingredients”, 1996.

Technical Data Sheet, Solvay Interox, “Hydrogen Peroxide in Hair Care”, 1996.

Technical Data Sheet, Solvay Interox, “Hydrogen Peroxide in All Fabric Bleach”, 1996.

Technical Data Sheet, Solvay Interox, “Hydrogen Peroxide in a Wood Bleach Formulation”, 1996.

Technical Data sheet, Solvay Interox, “Hydrogen Peroxide In Household Cleaners”, 1996.

Literature, Solvay Interox, “Hydrogen Peroxide In Consumer Products”, 1996.

Literature, Solvay Interox, “Hydrogen Peroxide consumer Products”, 1993.

Happi, Solvay Interox, Katherine Wetmur et al., “Formulating with Hydrogen Peroxide”, Feb. 1997.

Kirk–Othmer Encyclopedia of Chemical Technology, 3rd Edition, vol. 22, “Sulfonation and Sulfation to Thorium and Thorium Compounds”, pp. 360–377, (1983).

*Primary Examiner*—Joseph D. Anthony

*Attorney, Agent, or Firm*—George W. Moxon, II; Brian M. Kolkowski; Daniel J. Hudak

[57] ABSTRACT

The present invention relates to thickened aqueous bleach compositions containing either an alkali metal hypohalite or peroxygen bleach. Compositions containing hypohalite or peroxygen bleaches are particularly difficult to thicken with sufficient stability for commercial value. The addition of a rheology stabilizer minimizes the loss of stability over time and enables compositions of varying bleach and pH level to be obtained. These compositions comprise an alkali metal hypohalite or peroxygen bleach, a polymeric rheology modifying agent, an effective amount of a rheology stabilizing agent, sufficient alkalinity buffering agent, with the remainder being water.

6 Claims, No Drawings

THICKENED BLEACH COMPOSITIONS

CROSS-REFERENCE

This is a continuation of application Ser. No. 08/985,487, filed on Dec. 4, 1997, of Ambuter et al. for "Thickened Bleach Compositions" now U.S. Pat. No. 5,997,764.

FIELD OF THE INVENTION

The present invention relates to thickened aqueous bleach compositions, which contain either a peroxygen bleach or an alkali metal hypohalite bleach and a rheology stabilizing agent, having improved product and viscosity stability.

BACKGROUND OF THE INVENTION

Bleach compositions have long been used in a variety of detergent, personal care, pharmaceutical, textile and industrial applications. They serve to bleach and clean the surfaces into which they are brought into contact, and provide a disinfectant activity. Alkali metal hypohalite bleaches have long been used in household cleaning products and the textile and paper industries for the bleaching and cleaning of fabrics and wood fibers. They are also commonly used in cleaning products for disinfecting purposes. A typical alkali metal hypohalite is sodium hypochlorite. Peroxygen bleaches are less harsh than hypohalite bleaches and do not release objectionable gases or odors. This makes the use of such bleaches far more versatile, especially for personal care, oral care, and pharmaceutical compositions. Such bleaching agents, in the form of sodium percarbonate or sodium perborate, are commonly employed in powder or granular laundry detergent compositions and release active oxygen bleach upon exposure into an aqueous media.

Bleach compositions are often provided with increased viscosity for a wide variety of reasons, such as to enhance the aesthetics of a composition, improve ease of use, aid in suspension of other compositional ingredients, and to increase the residence time of the composition on application to vertical surfaces.

The use of polymeric rheology modifiers in these applications provides additional benefits in the unique rheology that they impart. These polymers tend to exhibit shear thinning rheological behavior. In other words, compositions thickened using polymeric rheology modifiers will, upon exposure to shear stress, show a decrease in their viscosity, which will allow easier delivery and application to and on their target substrate. Furthermore, upon removal of the shear stress, these compositions will rapidly recover to their initial viscosity. This property allows such compositions to be easily used with sprayer or trigger nozzle packaging despite their high initial or at rest viscosity.

Compositions containing polymeric rheology modifiers can exhibit a yield value which imparts vertical cling to non horizontal surfaces. The property of vertical cling enhances the contact time of the composition on its target substrate providing enhanced performance. This is especially valuable in compositions containing bleaches as enhanced bleaching and disinfecting will result. Further benefits of rheology modified compositions are noted in European Patent Publication (EP) 0606707 to Choy in the observation of decreased misting, reduced bleach odor, and a reduction in the amount of the composition that bounces back from a surface upon application. These attributes are of increased value for compositions containing bleaches by increasing the amount of product that is applied to the target substrate and reducing unintended and potentially harmful exposure of the composition to the person applying the composition.

Alkali metal hypohalite bleaches containing rheology modifiers are known. For example, U.S. Pat. No. 5,549,842 to Chang teaches the use of tertiary amine oxide surfactants to thicken hypohalite bleach containing compositions with 0.5 to 10.0% active chlorine levels. Also, U.S. Pat. No. 5,279,755 to Choy teaches the use of aluminum oxide thickeners to suspend calcium carbonate abrasive particles in the presence of a halogen bleach. However, many conventional polymeric rheology modifiers accelerate the degradation of hypohalite bleaches and thus are problematic for use in such compositions. Many of these polymers are themselves chemically unstable in the presence of a hypohalite bleach. Achieving a stable viscosity over the life of the composition has proven to be very difficult. To achieve stability, a variety of techniques have been employed. For example, Finley et al. in EP 0373864B1 and U.S. Pat. No. 5,348,682 teaches the use of a dual thickening system of an amine oxide surfactant and a polycarboxylate polymer to thicken chlorine bleach compositions with 0.4 to 1.2 available chlorine levels. U.S. Pat. No. 5,169,552 to Wise teaches the use of substituted benzoic acid structures in thickened liquid cleaning compositions with 0.2 to 2.5% active hypochlorite bleach and cross-linked polyacrylate polymer rheology modifiers. U.S. Pat. No. 5,529,711 and European Patent Publication 0649898 to Brodbeck et al. discloses the addition of alkali metals of benzoic acid as a hydrotrope to maintain viscosity and/or phase stability in the presence of certain anionic co-surfactants in thickened abrasive cleaning compositions. These compositions contain a dual surfactant and cross-linked polyacrylate polymer thickening system with 0.1 to 10.0% of a hypochlorite bleach. However, it was noted that none of the example compositions provided contained benzoic acid. Bendure et al. (EP 0523826) also discusses the addition of substituted benzoic acid structures to compositions containing cross-linked polyacrylate polymers and 0.2 to 4.0% hypochlorite bleach. The stated function of the additive is to increase the rate of flow of the composition from a container having an outlet opening of 8.45 mm in diameter.

Further, U.S. Pat. Nos. 5,185,096 and 5,225,096 and 5,229,027 disclose the use of iodine and iodate additives to improve the stability of cleaning compositions containing cross-linked polyacrylate polymers with 0.5 to 8.0% hypochlorite bleach. U.S. Pat. No. 5,427,707 to Drapier disclose the use of adipic or azelaic acid to improve the stability of cleaning compositions containing cross-lined polyacrylate polymers and 0.2 to 4.0% hypochlorite bleach. U.S. Pat. No. 5,503,768 to Tokuoka et al. teaches the use of aromatic compounds containing an oxygen, sulfur or nitrogen atom adjacent to the aromatic ring as halogen scavengers to suppress the release of halogen gas in acidic compositions if a halogen bleach is inadvertently added. But, Tokuoka is silent about improving the stability of a polymeric thickened compositions containing an halogen bleach. Further, while European Patent Publication 0606707 to Choy et al teaches the use of cross-linked polyacrylate polymers to thicken 0.1 to 10.0% hypochlorite compositions, per se, it does not show any stability data for the example compositions which are disclosed.

Aqueous peroxygen bleach compositions generally have not been utilized as much as alkali metal hypohalites bleaches due to the greater instability of peroxygen bleaches in aqueous compositions. The greater instability is especially relevant and frequently noted for alkaline pH compositions. Alkaline pH's are commonly preferred for cleaning, disinfecting, and hair dyeing applications. Considerable effort has been expended in the search for stabile aqueous peroxygen bleach compositions. For example, U.S. Pat. No. 4,046,705 to Yagi et al. teaches the incorporation of a chelating compound which is an unsaturated 5 or 6 member heterocyclic ring compound to inorganic peroxygen bleaches for powder laundry detergents to improve the stability in such compositions. U.S. Pat. Nos. 4,839,156 and 4,788,052 to Ng et al. discloses aqueous gelled hydrogen peroxide dental compositions where the gelling agent is a poly-oxyethylene poly-oxypropylene block copolymer surfactant. Additionally, Ng controls the pH of such compositions to limit them to 4.5 to 6.0. U.S. Pat. No. 4,839,157 to Ng et al. discloses aqueous hydrogen peroxide dental compositions where the gelling agent is filmed silica and the pH is 3 to 6. U.S. Pat. No. 4,696,757 to Blank et al. discloses aqueous gelled hydrogen peroxide compositions where the gelling agent is a poly-oxyethylene poly-oxypropylene block copolymer surfactant with glycerin, and the pH is limited to 6.

U.S. Pat. No. 4,238,192 to Kandathil discloses hydrogen peroxide compositions useful for household products having a pH of 1.8 to 5.5, but does not teach the use of gelling agents or thickened products. U.S. Pat. No. 4,497,725 to Smith et al. discloses aqueous alkaline peroxide formulations which use substituted amino compounds and phosphonate chelators for improved stability, but without using gelling agents.

U.S. Pat. No. 5,393,305 to Cohen et al. discloses a two part hair dye system where the developer phase contains a polymeric thickener and hydrogen peroxide. The polymeric thickener is limited to a copolymer that is insoluble in the developer phase, which has a pH range 2 to 6. The polymer becomes soluble and thickens upon reaction with the alkaline dye phase upon application. U.S. Pat. No. 5,376,146 to Casperson et al. also teaches the use of polymeric thickeners to thicken hydrogen peroxide in the developer phase of a two part hair dye application, where the polymeric thickener is limited to copolymers that are insoluble in the developer phase and the pH of the developer phase is 2 to 6. Casperson teaches against the use of cross-linked polyacrylate polymers or carbomers as they are soluble in the developer phase and are not stable.

Other teachings of peroxide systems, which are not suggested for thickened systems include, U.S. Pat. No. 5,419,847 to Showell et al. which teaches aqueous compositions containing hydrogen peroxide and bleach activators, where the pH is 3.5 to 4.5 and enhanced stability is provided by the addition of carboxylate, polyphosphate and phosphonate chelators. U.S. Pat. No. 5,264,143 to Boutique discloses stabilized compositions containing a water soluble peroxygen bleach. Enhanced stability is provided by the addition of diphosphonate compounds to chelate residual transition metals. The pH of such compositions are greater than 8.5. U.S. Pat. No. 4,900,468 to Mitchell et al. discloses aqueous compositions containing hydrogen peroxide, surfactant, fluorescent whiteners and dyes. The compositions are stabilized with the addition of heavy metal chelators and free radical scavengers. The preferred free radical scavengers are butylated hydroxy toluene (BHT) and mono-ter-butyl hydroquinone (MTBHQ). The pH of such compositions are most preferably from 2–4. U.S. Pat. No. 5,180,514 to Farr et al. discloses aqueous compositions containing hydrogen peroxide, surfactant, fluorescent whiteners and dyes. The compositions are stabilized with the addition of heavy metal chelators and free radical scavengers. The preferred free radical scavengers are amine free radical scavengers. The pH of such compositions are most preferably from 2–4.

Literature from Solvay Interox, which is a supplier of peroxide compounds, entitled "Thickened Hydrogen Peroxide" and "Hydrogen Peroxide Compatible Ingredients", teaches gelling aqueous compositions containing hydrogen peroxide with cross-linked polyacrylate polymers, but this teaching is at an acidic pH range and does not suggest the use of stabilizing agents.

As is seen from the above discussion, in making gelled aqueous compositions containing bleaches and rheology modifying polymers, the type and level of the bleach, the compositional pH, and the particular polymer are all factors to be carefully considered in order to obtain a stable composition. Thus, there is need for thickened bleach compositions having greater formulation flexibility and stability across a variety of variables.

SUMMARY OF THE INVENTION

The present invention has resulted from the discovery that the use of certain rheology stabilizing agents will provide improved thickened aqueous bleaching compositions. The compositions of this invention comprise, by weight, from about 0.1% to 50% of an active alkali metal hypohalite or peroxygen bleach; from about 0.01% to about 10% of a polymeric rheology modifying agent; from about 0.001% to about 10% of a rheology stabilizing agent having the formula:

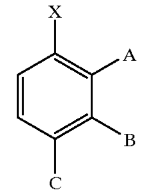

wherein X is $OCH_3$, $CH{:}CHCOO^-M^+$, or H for compositions containing an alkali metal hypohalite bleach; and X is $COO^-M^+$, $OCH_3$, $CH{:}CHCOO^-M^+$, or H for compositions containing a peroxide bleach; and each A, B, and C is H, OH, $COO^-M^+$, $OCH_3$, $CH_3$, CHO, $CH_2OH$, $COOCH_3$, $COOC_{1-4}H_{3-9}$, $OC_{1-4}H_{3-9}$, $C_{1-4}H_{3-9}$, $OCOCH_3$, $NH_2$, or mixtures thereof; and M is H, an alkali metal, or ammonium; sufficient alkalinity buffering agent to provide said composition with a pH from about 2 to about 14; and the remainder is water.

The present invention provides thickened bleach compositions having improved rheological properties and stability. The bleach compositions are useful for a variety of applications, including household, personal care, pharmaceutical, textile, and industrial applications.

DETAILED DESCRIPTION OF THE INVENTION

The compositions of the present invention comprise five essential ingredients: an bleach agent or bleach composition, which can be an alkali metal hypohalite bleach or peroxygen bleach, a polymeric rheology modifier, a rheology stabilizer, an alkalinity agent, and water.

Alkali Metal Hypohalite Bleach Ingredient

A source of the bleach can be selected from various halogen bleaches. As examples thereof, the bleach may be preferably selected from the group consisting essentially of the alkali metal and alkaline earth salts of hypohalite, hypohalite addition products, haloamines, haloinines, haloimides, and haloamides. These also produce hypohalous bleaching species in situ. Preferred is hypochlorite and compounds producing hypochlorite in aqueous solution, although hypobromite is another potential halogen bleach. Those bleaching agents which yield a hypochlorite species in aqueous solution, include alkali metal and alkaline earth metal hypochlorites, hypochlorites addition products, chloramines, chlorimines, chloramides, and chlorimides. Specific examples of compounds of this type include sodium, potassium, lithium, and calcium hypochlorite, monobasic calcium hypochlorite, dibasic magnesium hypochlorite, chlorinated trisodium phosphate dodecahydrate, potassium dichloroisocyanurate, sodium dichloroisocyanurate, sodium dichloroisocyanurate dihydrate, trichlorocyanuric acid, 1,3-dichloro-5,5-dimethylhydantoin, N-chlorosulfamide, Chloramine T, Dichloramine T, Chloramine B and Dichloramine B. A preferred bleaching agent for use in the compositions of the instant invention is sodium hypochlorite, potassium hypochlorite, or a mixture thereof.

The chlorine bleach ingredient is one which yields a hypochlorite species in aqueous solution. The hypochlorite ion is chemically represented by the formula OCl. The hypochlorite ion is a strong oxidizing agent, and materials which yield this species are considered to be powerful bleaching agents. The strength of an aqueous solution containing hypochlorite ion is measured in terms of available chlorine. This is the oxidizing power of the solution measured by the ability of the solution to liberate iodine from an acidified iodide solution. One hypochlorite ion has the oxidizing power of 2 atoms of chlorine, i.e., one molecule of chlorine gas.

At lower pH levels, aqueous solutions formed by dissolving hypochlorite-yielding compounds contains active chlorine, partially in the form of hypochlorous acid moieties and partially in the form of hypochlorite ions. At pH levels above about 10, which is preferred for compositions containing hypochlorite, essentially all (greater than 99%) of the active chlorine is reported to be in the form of hypochlorite ion.

Most of the above-described hypochlorite-yielding bleaching agents are available in solid or concentrated form and are dissolved in water during preparation of the compositions of the instant invention. Some of the above materials are available as aqueous solutions.

The above-described bleaching agents are dissolved in the aqueous liquid component of the present composition. The bleaching agents should provide from about 0.1% to 50% available chlorine by weight, preferably from 0.2 to 15% available chlorine.

Peroxygen Bleach Ingredient

A source of the bleach can be selected from the group of peroxygen bleaches, most preferably hydrogen peroxide. It is also possible to incorporate peroxygen bleaching compounds which are capable of yielding the desired proportion of hydrogen peroxide in the aqueous liquid bleach. Such compounds are well known in the art and can include alkali metal peroxides, organic peroxide bleach compounds such as urea peroxide, and inorganic persalt bleaching compounds such alkali metal perborates, percarbonates, perphosphates, and the like and mixtures thereof.

Hydrogen peroxide is a commercially available from a wide variety of sources, such as from Solvay-Interox, Degussa, The FMC Corporation, and E. I. DuPont. It is normally purchased as a concentrated aqueous solution, e.g., 35 to 70% active, and diluted down with deionized water to the desired strength. Additionally, the concentrated peroxide solution is often stabilized by the manufacturers with various types of chelating agents, most commonly phosphonates.

The peroxygen bleach compound will be employed in an amount to provide 0.1 to 50% by weight of active bleach based upon the total weight of the composition, preferably from 0.1 to 20%. It will be used at a pH of about 2 up to about 14.

Polymeric Rheology Modifier

The rheology modifying polymer is used in amount of about 0.01 to about 10% by weight based upon the weight of the coating composition. The range of about 0.01 to about 5% by weight is preferred, with the range of about 0.05 to about 2.5% by weight being further preferred. The rheology modifying polymer can be a non-associative thickener or stabilizer, such as a homopolymer or a copolymer of an olefinically unsaturated carboxylic acid or anhydride monomers containing at least one activated carbon to carbon olefinic double bond and at least one carboxyl group or an alkali soluble acrylic emulsion, or an associative thickener or stabilizer, such as a hydrophobically modified alkali soluble acrylic emulsion or a hydrophobically modified nonionic polyol polymer, i.e., a hydrophobically modified urethane polymer, or combinations thereof. The copolymers are preferably of a polycarboxylic acid monomer and a hydrophobic monomer. The preferred carboxylic acid is acrylic acid. The homopolymers and copolymers preferably are crosslinked.

Homopolymers of polyacrylic acid are described, for example, in U.S. Pat. No. 2,798,053. Examples of homopolymers which are useful include Carbopol® 934, 940, 941, Ultrez 10, ETD 2050, and 974P polymers, which are available from The B. F. Goodrich Company. Such polymers are homopolymers of unsaturated, polymerizable carboxylic monomers such as acrylic acid, methacrylic acid, maleic acid, itaconic acid, maleic anhydride, and the like.

Hydrophobically modified polyacrylic acid polymers are described, for example, in U.S. Pat. Nos. 3,915,921, 4,421,902, 4,509,949, 4,923,940, 4,996,274, 5,004,598, and 5,349,030. These polymers have a large water-loving hydrophilic portion (the polyacrylic acid portion) and a smaller oil-loving hydrophobic portion (which can be derived from a long carbon chain acrylate ester). Representative higher alkyl acrylic esters are decycl acrylate, lauryl acrylate, stearyl acrylate, behenyl acrylate and melissyl acrylate, and the corresponding methacrylates. It should be understood that more than one carboxylic monomer and more than one acrylate ester or vinyl ester or ether or styrenic can be used in the monomer charge. The polymers can be dispersed in water and neutralized with base to thicken the aqueous composition, form a gel, or emulsify or suspend a deliverable. Useful polymers are sold as Carbopol® 1342 and 1382 and Pemulen® TR-1, TR-2, 1621, and 1622, all available from BFGoodrich. The carboxyl containing polymers are prepared from monomers containing at least one activated vinyl group and a carboxyl group, and would include copolymers of polymerizable carboxylic monomers with acrylate esters, acrylamides, alkylated acrylamides, olefins, vinyl esters, vinyl ethers, or styrenics. The carboxyl containing polymers have molecular weights greater than about 500 to as high as several billion, or more, usually greater than about 10,000 to 900,000 or more.

Also useful are interpolymers of hydrophobically modified monomers and steric stabilizing polymeric surface active agents having at least one hydrophilic moiety and at least one hydrophobic moiety or a linear block or random comb configuration or mixtures thereof. Examples of steric stabilizers which can be used are Hypermer®, which is a poly(12-hydroxystearic acid) polymer, available from Imperial Chemical Industries Inc. and Pecosil®, which is a methyl-3-polyethoxypropyl siloxane-Ω-phosphate polymer, available from Phoenix Chemical, Somerville, N.J. These are taught by U.S. Pat. Nos. 4,203,877 and 5,349,030, the disclosures of which are incorporated herein by reference.

The polymers can be crosslinked in a manner known in the art by including, in the monomer charge, a suitable crosslinker in amount of about 0.1 to 4%, preferably 0.2 to 1% by weight based on the combined weight of the carboxylic monomer and the comonomer(s). The crosslinker is selected from polymerizable monomers which contain a polymerizable vinyl group and at least one other polymerizable group. Polymerization of the carboxyl-containing monomers is usually carried out in a catalyzed, free radical polymerization process, usually in inert diluents, as is known in the art.

Other polycarboxylic acid polymer compositions which can be employed include, for example, crosslinked copolymers of acrylates, (meth)acrylic acid, maleic anhydride, and various combinations thereof. Commercial polymers are avalable from Rheox Inc., Highstown, N.J. (such as Rheolate® 5000 polymer), 3 V Sigma, Bergamo, Italy (such as Stabelyn® 30 polymer, which is an acrylic acid/vinyl ester copolymer, or Polygel® and Synthalen® polymers, which are crosslinked acrylic acid polymers and copolymers), BFGoodrich (such as Carbopol EP-1 thickener, which is a acrylic emulsion thickener), or Rohm and Haas (such as Acrysol® ICS-1 and Aculyn® 22 thickeners, which are hydrophobically modified alkali-soluble acrylic polymer emulsions and Aculyn® 44 thickener, which is a hydrophobically modified nonionic polyol). Preferred are the Carbopol® and Pemulen® polymers, generally. The choice of the specific polymer to be employed will depend upon the desired rheology of the composition, and the identity of other compositional ingredients.

The Rheology Stabilizing Agent

The rheology stabilizing agent useful in the present invention has the following formula:

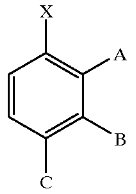

wherein X is $OCH_3$, $CH{:}CHCOO^-M^+$, or H for compositions containing an alkali metal hypohalite bleach; and X is $COO^-M^+$, $OCH_3$, $CH{:}CHCOO^-M^+$, or H for compositions containing a peroxide bleach; and each A, B, and C is H, OH, $COO^-M^+$, $OCH_3$, $CH_3$, CHO, $CH_2OH$, $COOCH_3$, $COOC_{1-4}H_{3-9}$, $OC_{1-4}H_{3-9}$, $C_{1-4}H_{3-9}$, $OCOCH_3$, $NH_2$, or mixtures thereof, and M is H, an alkali metal or ammonium.

The rheology stabilizing agent is used in an amount of between about 0.001 to 10% by weight of the total mixture, preferably 0.005 to 5% by weight.

Examples of rheology stabilizers are as follows:

| | X | A | B | C |
|---|---|---|---|---|
| methoxy benzene | $OCH_3$ | H | H | H |
| cresol methyl ether | $OCH_3$ | H | H | $CH_3$ |
| methoxybenzoic acid | $OCH_3$ | H | H | COOH |
| methoxybenzaldehyde | $OCH_3$ | H | H | CHO |
| methoxybenzyl alcohol | $OCH_3$ | H | H | $CH_2OH$ |
| dimethoxybenzene | $OCH_3$ | H | H | $OCH_3$ |
| anisidine | $OCH_3$ | H | H | $NH_2$ |
| methyl 4-methoxy benzoate | $OCH_3$ | H | H | $COOCH_3$ |
| ethyl methoxy benzoate | $OCH_3$ | H | H | $COOC_2H_5$ |
| dimethoxy benzoic acid | $OCH_3$ | COOH | H | $OCH_3$ |
| dimethoxy benzaldehyde | $OCH_3$ | COOH | $OCH_3$ | CHO |
| cinnamic acid | CH:CH COOH | H | H | H |
| hydroxy cinnamic acid | CH:CH COOH | H | H | OH |
| methyl cinnamic acid | CH:CH COOH | H | H | $CH_3$ |
| methoxy cinnamic acid | CH:CH COOH | H | H | $OCH_3$ |
| hydroxy methoxy cinnamic acid | CH:CH COOH | H | OH | $OCH_3$ |
| benzoic acid | COOH | H | H | H |
| hydroxy benzoic acid | COOH | H | H | OH |
| toluic acid | COOH | H | H | $CH_3$ |
| ethoxy benzoic acid | COOH | H | H | $OC_2H_5$ |
| ethyl benzoic acid | COOH | H | H | $C_2H_5$ |
| acetoxy benzoic acid | COOH | H | H | $OCOCH_3$ |
| dihydroxy benzaldehyde | H | OH | OH | CHO |
| methyl salicylate | H | OH | H | $COOCH_3$ |

Preferred rheology stabilizing agents are anisic aldehyde (or methoxybenzaldehyde), anisic alcohol, and anisic acid, especially the meta forms.

The rheology stabilizing agents described above are the acidic form of the species, i.e., M is H. It is intended that the present invention also cover the salt derivatives of these species, i.e., M is an alkali metal, preferably sodium or potassium, or ammonium.

Mixtures of the rheology stabilizing agents as described herein may also be used in the present invention.

Rheology modifying polymers, especially those that are cross-linked and or of high molecular weight, are vulnerable to bleach initiated degradation and can result in a loss of rheology that can be unacceptable for some applications. A certain small percentage of the bleach ingredient is present in solution in the form of a free radical, i.e., a molecular fragment having one or more unpaired electrons. In aqueous compositions, there are a number of free radical reactions that can be initiated from reaction of the bleach with another compositional ingredient or by self generation:

$$NaOCl^{\rightarrow} \cdot Na + \cdot OCl$$

$$NaOCl^{\rightarrow} \cdot NaCl + \cdot O$$

$$HO:OH^{\rightarrow} \cdot H + \cdot OOH$$

$$HO:OH^{\rightarrow} 2 \cdot OH$$

It is also documented that the presence of heavy metal cations also promotes the generation of free radicals. Such free radicals are self propagating and become a chain reaction until a termination product is produced. Prior to reaching this termination product, the free radicals are available to react with other organic species in the solution, e.g., the polymeric rheology modifier. These radicals are especially reactive with compounds having conjugated double bonds. Certain polymers of this invention are susceptible to this degradation because of presumed oxidizable sites present in the cross-linking structure.

Without wishing to be bound by theory, it is believed that the rheology stabilizing agent functions as a free radical scavenger, tying up the highly reactive species formed in the composition and preventing or reducing the attack on the degradation-susceptible structure of the polymeric rheology modifier. The structures of these rheology stabilizers include an electron donating aromatic ring which contains a lone pair containing hetero atom, such as an oxygen or nitrogen atom, adjacent to the aromatic ring. Importantly, the rheology stabilizer must be resistant to oxidation by the bleach itself in order to function as a free radical scavenger. In this invention, it is considered that the rheology stabilizer and the bleach free radical form a charge transfer complex or form a new compound via the charge transfer complex thus deactivating the free radical and preventing attack on the other ingredients in the composition, especially the polymeric rheology modifier. A possible mechanism is for a hydrogen atom connected to the oxygen or nitrogen atom to be attacked and extracted by a free radical to form water or another compound. The aromatic ring then stabilizes the newly formed radical on the oxygen or nitrogen. Other plausible reactions may be responsible for the observed improvement in stability by the addition of these compounds.

Buffering and/or Alkalinity Agent

In the instant compositions, it is desirable to include one or more buffering or alkalinity agents capable of achieving and/or maintaining the pH of the compositions within the desired pH range, determined as the pH of the undiluted composition with a pH meter.

For alkali metal hypohalite bleaches, maintenance of the composition pH above about 10, preferably above about 11.5, minimizes undesirable chemical decomposition of the active halogen, hypohalogen-yielding bleaching agents. Maintenance of this particular pH range also minimizes the chemical interaction between the strong hypohalite bleach and any surfactant compounds present in the instant compositions. High pH values such as those maintained by an optional buffering agent serve to enhance the soil and stain removal properties during utilization of the present compositions.

Any compatible material or mixture of materials which has the effect of achieving and/or maintaining the composition pH within the range from about 2 to about 14 can be utilized in the instant invention. Such materials can include, for example, various water-soluble, inorganic salts such as the carbonates, bicarbonates, sesquicarbonate, silicates, pyrophosphates, phosphates, hydroxides, tetraborates, and mixtures thereof. Examples of material which can be used either alone or in combination as the buffering agent herein include sodium carbonate, sodium bicarbonate, potassium carbonate, sodium sesquicarbonate, sodium silicate, potassium silicate, sodium pyrophosphate, tetrapotassium pyrophosphate, tripotassium phosphate, trisodium phosphate, anhydrous sodium tetraborate, sodium tetraborate pentahydrate, potassium hydroxide, ammonium hydroxide, sodium tetraborate pentahydrate, potassium hydroxide, sodium hydroxide, and sodium tetraborate decahydrate. Combination of these agents, which include the sodium, potassium and ammonium salts, may be used.

Organic neutralizers can also be used to adjust the pH of the composition. Such compounds include mono, di, and triethanolamine, di and trisopropanolamine.

The compositions of this present invention may also include an acid selected from the group consisting of organic and inorganic acids, or mixtures thereof. Suitable organic acids are disclosed in U.S. Pat. No. 4,238,192, Supra, incorporated herein by reference. Suitable organic acids include various saturated and unsaturated mono-, di-, tri-, tetra-, and pentacarboyxlic acids, such as acetic acid, hydroxyacetic acid, oxalic acid, formic acid, adipic acid, maleic acid, tartaric acid, lactic acid, gluconic acid, glucaric acid, glucuronic acid, citric acid, and ascorbic acid. Also certain nitrogen containing acids are suitable for use as the organic acid such as ethylene diamine tetracetic acid or diethylene triamine pentacetic acid. Examples of inorganic acids include hydrochloric, phosphoric, nitric, sulfuric, boric, and sulfamic acids, and mixtures thereof.

Water

It should be noted that a predominant ingredient in these compositions is water, preferably water with minimal ionic strength. This reduces the presence of heavy metals which will further catalyze the decomposition of the bleach. Additionally, some of the polymeric rheology modifiers are less efficient in the presence of excess ions, especially divalent ions. Water provides the continuous liquid phase into which the other ingredients are added to be dissolved, dispersed, emulsified, and/or suspended. Preferred is softened water, most preferred is deionized water.

Optional Materials

Surfactants

Surfactants are optional materials which are generally used to reduce surface tension, increase wetting, and enhance cleaning performance. The compositions of this invention can contain anionic, nonionic, amphoteric, zwitterionic surfactants or mixtures thereof. Potentially suitable surfactants are disclosed in the *Kirk-Othmer Encyclopedia of Chemical Technology*, 3$^{rd}$ Edition, Volume 22, pp. 360–377 (1983), the disclosure of which is incorporated herein by reference.

Examples of these are set forth in U.S. Pat. No. 5,169,552. In addition, other suitable surfactants for detergent compositions can be found in the disclosures of U.S. Pat. Nos. 3,544,473, 3,630,923, 3,888,781, 3,985,668 and 4,001,132, all of which are incorporated herein by reference.

Some of the aforementioned surfactants are bleach-stable but some are not. When the composition contains a hypochlorite bleach, it is preferable that the detergent surfactant is bleach-stable. Such surfactants desirably do not contain functions such as unsaturation and some aromatic, amide, aldehydic, methyl keto or hydroxyl groups which are susceptible to oxidation by the hypochlorite.

Examples of anionic surfactants include alkyl ether phosphate, alkyl aryl sulphonates, alkyl ether sulphates, alkyl sulphates, aryl sulphonates, carboxylated alcohol ethoxylates, isethionates,. olefin sulphonates, sarcosinates, taurates, taurinates, succinates, succinamates, fatty acid soaps, alkyl diphenyl disulfonates, etc., and mixtures thereof.

Examples of potential nonionic surfactants are alkanolamides, block polymers, ethoxylated alcohols, ethoxylated alkyl phenols, ethoxylated amines, ethoxylated amides, ethoxylated fatty acid, fatty esters, fluorocarbon based surfactant, glycerol esters, lanolin based derivatives, sorbitan derivatives, sucrose esters, polyglycol esters, and silicone based surfactant.

Examples of potential amphoteric surfactants include ethoxylated amines, amine oxides, amine salts, betaine derivatives, imidazolines, fluorocarbon based surfactants, polysiloxanes, and lecithin derivatives.

The specific identity of surfactants employed within the compositions of the present invention is not critical to the invention.

Builders, Sequestrants, and Chelators

Detergency builders are optional materials which reduce the free calcium and/or magnesium ion concentration in an aqueous solution. The detergency builder material can be any of the detergent builder materials known in the art which include trisodium phosphate, tetrasodium pyrophosphate, sodium tripolyphosphate, sodium hexametaphosphate, potassium pyrophosphate, potassium tripolyphosphate, potassium hexametaphosphate.

Other builders include sodium and potassium silicates having $SiO_2$:$Na_2O$ or $SiO_2$:$K_2O$ weight ratios of from about 1:1 to about 3.6:1, alkali metal metasilicates, alkali metal carbonates, alkali metal hydroxides, alkali metal gluconates, phosphonates, alkali metal nitriloacetates, alumino silicates (zeolites), borax, sodium nitrilotriacetate, sodium carboxymethyloxysuccinate, sodium carboxymethyloxymalonate, polyphosphonates, salts of low molecular weight carboxylic acids, and polycarboxylates, such as polyacrylates or polymaleates, copolymers and mixtures thereof.

Representative examples of suitable chelants for use herein include but are not limited to carboxylates, such as ethylene diamine tetracetate (EDTA) and diethylene triamine pentaacetate (DTPA); polyphosphates, pyrophosphates, phosphonates, citric acid, dipicolinic acid, picolinic acid, hydroxyquinolines; and combinations thereof. Furthermore, the chelating agents can be any of those described in U.S. Pat. Nos. 3,442,937 and 3,192,255, and 2,838,459 and 4,207,405, Supra, incorporated herein by reference.

Some of the above-described buffering agent materials additionally serve as builders, sequestrants or chelators.

Other Optional Materials

Other optional materials include bleach activators, solvents, suds suppressers, corrosion inhibitors, fluorescent whitening agents, chelating agents, anti-redeposition agents, dispersants, dye scavengers, enzymes, emollients, humectants, preservatives, film forming and soil release polymers. Hydrotropes which are generally described as non-micelle forming substances capable of solubilizing insoluble compounds in a liquid medium can also be used. As a dispersant, the hydrotrope acts to prevent micelle formation by any anionic surfactant present. Examples of potential hydrotropes include alkyl sulfates and sulfonates with 6–10 carbons in the alkyl chain, $C_{8-14}$ dicarboxylic acids, and unsubstituted and substituted, especially the alkali metal salts of, aryl sulfonates; and unsubstituted and substituted aryl carboxylates.

Other optional and desirable components include, but are not limited to, the clays and the abrasives disclosed in U.S. Pat. No. 3,985,668, which is incorporated herein by reference. Examples of such abrasives include calcium carbonate, perlite, silica sand, quartz, pumice, feldspar, triploi, and calcium phosphate. Further, optional materials include an alkali metal salts of amphoteric metal anions, as well as dyes, pigments, fragrances, perfumes, flavors, sweeteners, and the like which are added to provide aesthetic benefits.

TYPICAL EXAMPLES

In order to illustrate the present invention, examples of compositions in accordance with the present invention were made and tested to determine the characteristics of the composition, especially the stability of the compositions. Unless otherwise indicated, all parts and percentages used in the examples are by weight based upon the total weight of the composition, including the dosages of the rheology stabilizers. In the examples, the viscosities reported were run at 20° C. on a Brookfield Viscometer Model RVT-DV-II+ with the appropriate spindle at 20 rpm and reported as centipoise (cP).

Example #1

The following example shows improved rheological stability of a 5.00% active sodium hypochlorite composition via the incorporation of rheology stabilizers. Viscosity stability is compared to compositions without any stabilizer and versus benzoic acid. The compositions were prepared by first dispersing the polyacrylic acid polymer into the water. This was followed by the addition of the rheology stabilizer. The compositions were then neutralized to the target pH followed by the addition of the chlorine bleach. The initial viscosity was then recorded. The compositions were then placed into a 50° C. storage oven and periodically monitored for viscosity.

| Formula | % by Weight |
|---|---|
| DI Water | 52.35 |
| Carbopol ® 672 | 2.00 |
| Rheology Stabilizer | 0.50 |
| Sodium hydroxide (50%) | to pH 13 |
| Sodium hypochlorite (13%) | 38.46 |
| | 100.00 |

| Rheology | 20 rpm Brookfield Viscosity - weeks storage at 50° C. | | | | | | | |
|---|---|---|---|---|---|---|---|---|
| Stabilizer | 0 | 1 | 2 | 3 | 4 | 5 | 7 | 8 |
| none | 745 | 850 | 340 | 25 | | | | |
| benzoic acid | 630 | 830 | 620 | 200 | | | | |
| 10-camphor sulfonic acid | 670 | 1,230 | 1,210 | 660 | 215 | 20 | | |
| cinnamic acid | 670 | 1,175 | 1,490 | 1,300 | 970 | 475 | 130 | |
| para anisic acid | 650 | 1,000 | 1,160 | 1,180 | 1,100 | 830 | 700 | 360 |
| meta anisic acid | 640 | 1,085 | 1,350 | 1,560 | 1,660 | 1,400 | 1,000 | 960 |
| ortho anisic acid | 690 | 1,055 | 1,230 | 1,390 | 1,140 | 925 | 925 | |
| anisic alcohol | 700 | 1,100 | 1,330 | 1,330 | 1,280 | 1,000 | 780 | 720 |
| anisol | 545 | 1,125 | 1,400 | 1,355 | 1,300 | 1,000 | 800 | 800 |
| p-cresol methyl ether | 850 | 1,260 | 1,500 | 1,490 | 1,254 | 950 | | |

Example #2

The following example shows improved rheological stability of a 5.00% active sodium hypochlorite composition via the incorporation of rheology stabilizers. Viscosity stability is compared to compositions without any stabilizer. The compositions were prepared by first dispersing the polyacrylic acid polymer into the water. This was followed by the addition of the rheology stabilizer. The compositions were then neutralized to the target pH followed by the addition of the chlorine bleach. The initial viscosity was then recorded. The compositions were then placed into 40° C. and 50° C. storage ovens and periodically monitored for viscosity.

| Formula | % by Weight |
|---|---|
| DI Water | balance |
| Carbopol 676 | 2.00 |
| Rheology Stabilizer | varies |
| Sodium hydroxide (50%) | to pH 13 |
| Sodium hypochlorite (13%) | 38.46 |
| | 100.00 |

| Rheology | 20 rpm Brookfield Viscosity - days storage at 40° C. | | | | | | | |
|---|---|---|---|---|---|---|---|---|
| Stabilizer | 0 | 14 | 28 | 42 | 66 | 84 | 112 | 126 |
| none | 140 | 475 | 1,000 | 1,450 | 1,400 | 1,900 | 650 | 400 |
| 0.30 meta anisic acid | 100 | 275 | 475 | 810 | 1,000 | 1,050 | 1,500 | 2,100 |
| 0.50 anisic alcohol | 52 | 225 | 400 | 710 | 850 | 800 | 1,200 | 1,500 |
| 0.30 anisic alcohol | 94 | 300 | 600 | 1,225 | 1,250 | 1,250 | 1,650 | 2,200 |
| 0.50 m-methoxy-benzaldehyde | 196 | 150 | 625 | 1,000 | 1,085 | 1,050 | 1,700 | 2,500 |
| 0.3 m-methoxy-benzaldehyde | 156 | 300 | 550 | 1,100 | 1,100 | 1,100 | 1,700 | 2,500 |
| 0.50 p-methoxy-benzaldehyde | 168 | 300 | 580 | 1,000 | 1,075 | 1,075 | 2,000 | 2,400 |

| Rheology | 20 rpm Brookfield Viscosity - days storage at 50° C. | | | | | | | |
|---|---|---|---|---|---|---|---|---|
| Stabilizer | Initial | 14 | 28 | 42 | 66 | 84 | 112 | 126 |
| none | 140 | 850 | 280 | 1 | | | | |
| 0.30 meta anisic acid | 100 | 500 | 1350 | 1300 | 1450 | 1500 | 760 | 2300 |
| 0.50 anisic alcohol | 52 | 500 | 1100 | 470 | 1 | | | |
| 0.30 anisic alcohol | 94 | 750 | 1385 | 1340 | 800 | 750 | 600 | 325 |
| 0.50 m-methoxy-benzaldehyde | 196 | 900 | 1700 | 1630 | 2150 | 2400 | 3000 | 4000 |
| 0.3 m-methoxy-benzaldehyde | 156 | 625 | 1450 | 1300 | 1800 | 2000 | 2250 | 2250 |
| 0.50 p-methoxy-benzaldehyde | 168 | 630 | 1200 | 1160 | 1620 | 1400 | 540 | 340 |

Example #3

The following example shows improved rheological stability of a 1.00% active sodium hypochlorite composition via the incorporation of rheology stabilizers. Viscosity stability is compared to compositions without any stabilizer. The compositions were prepared by first dispersing the polyacrylic acid polymer into the water. This was followed by the addition of the rheology stabilizer. The compositions were then neutralized to the target pH followed by the addition of the chlorine bleach. The initial viscosity was then recorded. The compositions were then placed into a 50° C. storage oven and periodically monitored for viscosity.

| Formula | % by Weight |
|---|---|
| DI Water | balance |
| Carbopol 676 | 1.00 |
| Rheology Stabilizer | varies |
| Sodium hydroxide (50%) | to pH 13 |
| Sodium hypochlorite (13%) | 7.69 |
| | 100.00 |

| Rheology | 20 rpm Brookfield Viscosity - days storage at 50° C. | | | | | | | |
|---|---|---|---|---|---|---|---|---|
| Stabilizer | 0 | 14 | 28 | 42 | 66 | 84 | 112 | 126 |
| none | 2.515 | 2,900 | 2,800 | 1,600 | 450 | 100 | 1 | |
| 0.15 anisic alcohol | 2,535 | 3,400 | 3,100 | 2,000 | 250 | 100 | 1 | |
| 0.25 anisic alcohol | 2,115 | 2,800 | 3,000 | 2,300 | 1,850 | 1,680 | 700 | 500 |
| 0.15 m-methoxy-benzaldehyde | 1,785 | 2,300 | 2,500 | 2,300 | 2,300 | 3,350 | 4,400 | 4,300 |
| 0.25 m-methoxy-benzaldehyde | 1,875 | 2,400 | 2,725 | 2,800 | 2,400 | 6,100 | 7,400 | 7,700 |
| 0.15 p-methoxy-benzaldehyde | 1,140 | 1,700 | 1,900 | 1,600 | 1,675 | 1,600 | 2,000 | 3,300 |
| 0.25 p-methoxy-benzaldehyde | 2,140 | 2,800 | 3,100 | 3,300 | 2,900 | 2,700 | 2,500 | 2,500 |

Example #4

The following example shows improved rheological stability of an automatic dishwashing gel with 3.00% active sodium hypochlorite via the incorporation of rheology stabilizers. Viscosity stability is compared to compositions without any stabilizer. The compositions were prepared by first dispersing the polyacrylic acid polymer into the water. This was followed by the addition of the rheology stabilizer. The compositions were then neutralized to the target pH with sodium and potassium hydroxide. This was followed by the addition of the silicate, carbonate, and tripolyphosphate. The chlorine bleach was then added followed lastly by the disulfonate surfactant. The initial viscosity was then recorded. The compositions were then placed into a 50° C. storage oven and periodically monitored for phrase separation.

| Formula | % by Weight |
|---|---|
| DI Water | balance |
| Carbopol 676 | 1.00 |
| Rheology Stabilizer | 0.25 |
| Potassium hydroxide (45%) | 5.00 |
| Sodium hydroxide (50%) | 5.00 |
| 2.1 r potassium silicate (39%) | 15.00 |
| Potassium carbonate | 5.00 |
| Sodium tripolyphosphate | 20.00 |
| Sodium hypochlorite (12.50%) | 24.00 |
| Sodium n-decyl diphenyloxide disulfonate (45%) | 1.00 |
| | 100.00 |

-continued

| Rheology Stabilizer | Time to Phase Separation at 40° C. Storage |
|---|---|
| none | 3 weeks |
| o-anisic acid | 4 months+ |
| p-anisic acid | 4 months |
| m-anisic acid | 4 months+ |

Example #5

The following example shows improved rheological stability of an automatic dishwashing gel with 1.00% active sodium hypochlorite via the incorporation of rheology stabilizer. Viscosity stability is compared to compositions without any stabilizer. The compositions were prepared by first dispersing the polyacrylic acid polymer into the water. The compositions were then neutralized to the target pH with sodium and potassium hydroxide. This was followed by the addition of the silicate, carbonate, and tripolyphosphate. The chlorine bleach was then added followed lastly by the disulfonate surfactant. The initial viscosity was then recorded. The compositions were then placed into a 50° C. storage oven and periodically monitored for viscosity.

| Formula | % by Weight |
|---|---|
| DI Water | balance |
| Carbopol 676 | 0.75 |
| Rheology Stabilizer | varies |
| Potassium hydroxide (45%) | 5.00 |
| Sodium hydroxide (50%) | 5.00 |
| 2.1 r potassium silicate (39%) | 15.00 |
| Potassium carbonate | 5.00 |
| Sodium tripolyphosphate | 20.00 |
| Sodium hypochlorite (12.50%) | 8.00 |
| Sodium n-decyl diphenyloxide disulfonate (45%) | 1.00 |
| | 100.00 |

| | 20 rpm Brookfield Viscosity Days storage at 50° C. | | | | |
|---|---|---|---|---|---|
| Rheology Stabilizer | 0 | 7 | 14 | 28 | 49 |
| none | 6.850 | 8,000 | 0 | 0 | 0 |
| 1.0 p-anisic alcohol | 6.400 | 7,000 | 7,700 | 2,000 | 0 |
| 0.1 m-methoxybenzaldehyde | 6.280 | 9,600 | 8,400 | 9,800 | 0 |

Example #6

The following example shows improved rheological stability of compositions containing 5.00% active hydrogen peroxide. Viscosity stability is compared to a composition without any rheology stabilizer. The compositions were prepared by first dispersing the polyacrylic acid polymer into the water. This was followed by the addition of the rheology stabilizer. The compositions were then neutralized to the target pH with sodium hydroxide. This was followed by the addition of the hydrogen peroxide. The initial viscosity was then recorded. The compositions were then placed into a 40° C. storage oven and periodically monitored for viscosity.

| Formula | % by Weight |
|---|---|
| DI Water | balance |
| Carbopol 672 | 1.00 |
| Rheology Stabilizer | varies |
| Sodium hydroxide (50%) | to pH 7 |
| Hydrogen Peroxide (35%) | 14.28 |
| | 100.00 |

| | Rheology | 20 rpm Brookfield Viscosity - days storage at 40° C. | | | | | |
|---|---|---|---|---|---|---|---|
| pH | Stabilizer | 0 | 14 | 35 | 42 | 56 | 70 |
| 5 | none | 35,700 | 36,500 | 36,600 | 35,100 | 36,500 | 32,800 |
| 5 | 1.00 sodium benzoate | 6,700 | 8,400 | 12,600 | 12,600 | 13,000 | 12,900 |
| 7 | none | 44,300 | 17,600 | 3,800 | 1 | | |
| 7 | 1.00 sodium benzoate | 8,000 | 8,200 | 11,000 | 17,400 | 11,000 | 11,900 |
| 9 | none | 29,300 | 18,900 | 8,200 | 1 | | |
| 9 | 1.00 sodium benzoate | 7,700 | 7,800 | 6,200 | 12,700 | 6,750 | 5,300 |

Example #7

The following example shows improved rheological stability of compositions containing 5.00% active hydrogen peroxide. Viscosity stability is compared to a composition without any rheology stabilizer and versus Versenate® PS, a phosponate chelator recommended for hydrogen peroxide formulations. The compositions were prepared by first dispersing the polyacrylic acid polymer into the water. This was followed by the addition of the rheology stabilizer. The compositions were then neutralized to the target pH with sodium hydroxide. This was followed by the addition of the hydrogen peroxide. The initial viscosity was then recorded. The compositions were then placed into a 40° C. storage oven and periodically monitored for viscosity.

| Formula | % by Weight |
|---|---|
| DI Water | balance |
| Carbopol 676 | 1.00 |
| Rheology Stabilizer | varies |
| Sodium hydroxide (50%) | to pH 7 |
| Hydrogen Peroxide (35%) | 14.28 |
| | 100.00 |

| | 20 rpm Brookfield Viscosity - days storage at 40° C. | | | | | | |
|---|---|---|---|---|---|---|---|
| Rheology Stabilizer | 0 | 7 | 14 | 21 | 28 | 56 | 70 |
| none | 36,000 | | 6,100 | 4,300 | 730 | | |
| 1.00 sodium benzoate | 7,500 | | 8,000 | | 6,500 | 6,500 | 6,000 |
| 1.00% Versenate PS | 3,900 | | | | | 2,400 | 1,850 |
| 0.50 m-anisic acid | 21,000 | 12,600 | 9,000 | 3,700 | | | |
| 0.5 p-anisic alcohol | 40,000 | 38,500 | 42,000 | 42,000 | | | |
| 1.0 p-anisic alcohol | 41,000 | 34,000 | 36,000 | | 34,000 | 32,000 | 26,000 |
| 0.5 p-methoxybenzaldehyde | 38,500 | 32,000 | 35,000 | 28,000 | 22,400 | | |
| 0.5 anisidine | 41,000 | 22,000 | 12,900 | | | | |

Example #8

The following example shows improved rheological stability of compositions containing 5.00% active hydrogen peroxide. Viscosity stability is compared to a composition without any rheology stabilizer. The compositions were prepared by first dispersing the polyacrylic acid polymer into the water. This was followed by the addition of the rheology stabilizer. The compositions were then neutralized to the target pH with sodium hydroxide. This was followed by the addition of the hydrogen peroxide. The initial viscosity was then recorded. The compositions were then placed into a 40° C. storage oven and periodically monitored for viscosity.

| Formula | % by Weight |
|---|---|
| DI Water | balance |
| Carbopol 676 | 1.00 |
| Rheology Stabilizer | varies |
| Sodium hydroxide (50%) | to pH 7 |
| Hydrogen Peroxide (35%) | 14.28 |
| | 100.00 |

| | 20 rpm Brookfield Viscosity - days storage at 4000 | | | | | | | |
|---|---|---|---|---|---|---|---|---|
| Rheology Stabilizer | 0 | 7 | 14 | 28 | 42 | 66 | 84 | 112 |
| none | 50,600 | 27,800 | 7,200 | 300 | 1 | | | |
| 1.00 anisic alcohol | 50,200 | 38,000 | 23,000 | 14,500 | 21,000 | 18,000 | 18,000 | 15,000 |
| 0.50 anisic alcohol | 47,200 | 40,400 | 21,750 | 20,250 | 21,000 | 14,500 | 13,800 | 12,500 |
| 0.25 anisic alcohol | 45,800 | 37,200 | 20,000 | 15,000 | 15,000 | 8,000 | 15,000 | 1 |
| 1.00 m-methoxybenzaldehyde | 43,200 | 30,200 | 27,500 | 26,000 | 26,000 | 22,500 | 22,500 | 21,000 |
| 0.50 m-methoxybenzaldehyde | 42,200 | 30,800 | 22,500 | 26,750 | 27,000 | 15,000 | 19,000 | 17,500 |
| 0.25 m-methoxybenzaldehyde | 45,400 | 32,400 | 22,500 | 16,250 | 12,000 | 9,500 | 9,000 | 4,700 |

Example #9

The following example shows improved rheological stability of compositions containing 3.00% active hydrogen peroxide at pH 7 and pH 8. Viscosity stability is compared to a composition without any rheology stabilizer. The compositions were prepared by first dispersing the polyacrylic acid polymer into the water. This was followed by the addition of the rheology stabilizer. The composition was then neutralized to the target pH with sodium hydroxide. This was followed by the addition of the hydrogen peroxide. The initial viscosity was then recorded. The compositions were then placed into a 40° C. storage oven and periodically monitored for viscosity.

| Formula | % by Weight |
|---|---|
| DI Water | balance |
| Carbopol 676 | 1.00 |
| Rheology Stabilizer | varies |
| Sodium hydroxide (50%) | to pH |
| Hydrogen Peroxide (35%) | 8.57 |
| | 100.00 |

| | | 20 rpm Brookfield Viscosity - days storage at 40° C. | | | | | | |
|---|---|---|---|---|---|---|---|---|
| Rheology Stabilizer | pH | 0 | 14 | 28 | 45 | 67 | 110 | 170 |
| 1.00 m-methoxybenzaldehyde | 7 | 63,200 | 66,000 | 66,200 | 66,200 | 66,200 | 54,000 | 54,000 |
| 0.50 m-methoxybenzaldehyde | 7 | 68,600 | 68,600 | 68,600 | 68,600 | 68,600 | 64,000 | 68,600 |
| 0.25 m-methoxybenzaldehyde | 7 | 65,400 | 70,000 | 70,000 | 70,000 | 70,000 | 60,000 | 60,000 |
| 1.00 m-methoxybenzaldehyde | 8 | 56,800 | 36,000 | 36,000 | 30,000 | 44,000 | 40,000 | 43,000 |
| 0.50 m-methoxybenzaldehyde | 8 | 60,200 | 50,000 | 60,000 | 52,000 | 27,000 | 46,000 | 45,000 |
| 0.25 m-methoxybenzaldehyde | 8 | 65,200 | 44,000 | 36,000 | 20,000 | 14,400 | 7,600 | 3,300 |

Example #10

The following example shows improved rheological stability of compositions containing 3.50% active hydrogen peroxide with a nonionic surfactant. The compositions were prepared by first dispersing the polyacrylic acid polymer into the water. This was followed by the addition of the rheology stabilizer. The compositions were then neutralized to the target pH with sodium hydroxide followed by the addition of the surfactant. This was followed by the addition of the hydrogen peroxide. The initial viscosity was then recorded. The compositions were then placed into a 40° C. storage oven and periodically monitored for viscosity.

| Formula | % by Weight |
|---|---|
| DI Water | balance |
| Carbopol 672 | 1.00 |
| m-methoxybenzaldehyde | 0.5 |
| Sodium hydroxide (50%) | to pH 7 |
| Neodol 25-3 (Nomonic surfactant) | varies |
| Hydrogen Peroxide (35%) | 10.00 |
| | 100.00 |

| | 20 rpm Brookfield Viscosity - days storage at 40° C. | | | | | | | |
|---|---|---|---|---|---|---|---|---|
| Surfactant Level | 0 | 7 | 14 | 28 | 42 | 56 | 70 | 95 |
| none | 54000 | 32400 | 29000 | 23500 | 23500 | 23500 | 24000 | 21000 |
| 5.00 | 33500 | 31000 | 28000 | 24000 | 24000 | 22500 | 22500 | 23000 |

Thus as can be seen, the present invention provides improved rheological stability over broader levels and types of oxidizing agents, over a broader pH range, and for a broad range of synthetic thickeners. The present invention has demonstrated stability in excess of 8 weeks at 50° C. versus 4 weeks for current additive technology. Thus the present invention allow for custom design of stability targets, low usage level of rheology stabilizer, and use of non-ionic stabilizers to minimize impact on efficiency, and a capability to thicken peroxide in alkaline realm technology applicable to wide range of thickener types, while providing good compatibility with other formula components.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What I claim is:

1. A stabilized thickened aqueous bleach composition comprising, by weight;

a. from about 0.1% to 50% of an alkali metal hypohalite bleach oxidizing agent;

b. from about 0.01% to about 10% of a polymeric rheology modifying agent, wherein said polymeric rheology modifying agent is a homopolymer or a copolymer or a cross-linked polymer or a cross-linked copolymer of an olefinically unsaturated carboxylic acid, or an anhydride monomer containing at least one activated carbon to carbon olefinic double bond and at least one carboxy group, or is an alkali soluble acrylic emulsion, or a hydrophobically modified alkali soluble acrylic emulsion, or a hydrophobically modified non-ionic polyol polymer, or a combination thereof c. from about 0.001% to about 10% of a rheology stabilizing agent having the formula

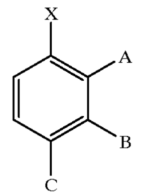

wherein X is $OCH_3$ or $CH{:}CHCOO^-M^-$ or H; and each A, B, and C is H or OH, or $OCH_3$, or $CH_3$, or CHO, or $CH_2OH$, or $COOCH_3$, or $COOC_{1-4}H_{3-9}$, or $OC_{1-4}H_{3-9}$, or $C_{1-4}H_{3-9}$, or $OCOCH_3$, or $NH_2$, or mixtures thereof; and M is H or an alkali metal or ammonium;

d. sufficient alkalinity buffering agent to provide said composition with a pH from about 10 to about 14; and e. water.

2. The composition of claim 1, wherein the oxidizing agent contains at least 3% by weight chlorine based upon the weight of the composition.

3. The composition of claim 1, wherein said polymeric rheological modifier is a cross-linked acrylic acid polymer thickener.

4. The composition of claim 1, wherein said polymeric rheological modifier is a cross-linked acrylic acid copolymer thickener.

5. The composition of claim 1, wherein the oxidizing agent is sodium hypochlorite.

6. The composition of claim 5, wherein the rheology stabilizing agent is anisic alcohol or anisic aldehyde.

* * * * *